(12) United States Patent
Naghdi

(10) Patent No.: US 8,880,119 B1
(45) Date of Patent: Nov. 4, 2014

(54) TRACKING SYSTEM

(71) Applicant: Michael P. Naghdi, Columbus, OH (US)

(72) Inventor: Michael P. Naghdi, Columbus, OH (US)

( * ) Notice: Subject to any disclaimer, the term of this patent is extended or adjusted under 35 U.S.C. 154(b) by 0 days.

(21) Appl. No.: 13/903,386

(22) Filed: May 28, 2013

Related U.S. Application Data

(60) Provisional application No. 61/824,049, filed on May 16, 2013.

(51) Int. Cl.
    H04M 1/00      (2006.01)
    H04M 1/725     (2006.01)
    H04W 88/02     (2009.01)

(52) U.S. Cl.
    CPC .......... *H04W 88/02* (2013.01); *H04M 1/72522* (2013.01); *H04M 1/72519* (2013.01)
    USPC ..................... 455/556.1; 455/550.1; 455/457; 368/13

(58) Field of Classification Search
    CPC ..................... H04M 1/72522; H04M 1/72519; H04W 4/02; H04B 1/385
    USPC ........................ 455/556.1, 550.1, 457; 368/13
    See application file for complete search history.

(56) References Cited

U.S. PATENT DOCUMENTS

| | | | |
|---|---|---|---|
| 5,812,056 A | 9/1998 | Law | |
| 6,243,039 B1 | 6/2001 | Elliot | |
| 6,990,047 B1 * | 1/2006 | Barbagiovanni et al. | 368/10 |
| D520,393 S | 5/2006 | Darby | |
| 2004/0140898 A1 * | 7/2004 | Reeves | 340/573.1 |
| 2006/0287872 A1 | 12/2006 | Simrell | |
| 2007/0200695 A1 | 8/2007 | Almstrand et al. | |
| 2007/0252690 A1 | 11/2007 | Pate | |
| 2008/0106399 A1 * | 5/2008 | Yaqub et al. | 340/539.11 |
| 2010/0262367 A1 | 10/2010 | Riggins et al. | |
| 2011/0255379 A1 * | 10/2011 | Vidal | 368/70 |
| 2012/0050532 A1 * | 3/2012 | Rhyins | 348/143 |
| 2012/0270559 A1 * | 10/2012 | Ingerson | 455/456.1 |
| 2013/0326790 A1 * | 12/2013 | Cauwels et al. | 2/170 |
| 2014/0052681 A1 * | 2/2014 | Nitz et al. | 706/46 |
| 2014/0107816 A1 * | 4/2014 | Guedalia et al. | 700/91 |

* cited by examiner

Primary Examiner — Danh Le

(57) ABSTRACT

A personal global tracking system has a waterproof tracking unit operatively interfacing with a global tracking system infrastructure via a microprocessor connected to a transceiver. A tracking unit bottom surface has a unique barcode and a body temperature sensor. A tracking unit top surface has a power button, an alarm arming activation component, an alarm activation component, an auxiliary unit arming activation component, light emitting diodes for indicating status, and a facia. The system has a locking tamper-proof wristband with an alarm activation component and a pulse sensor. The system has a waterproof auxiliary unit. The system has a tracking system infrastructure including a cellular phone tower system, a global positioning satellite system, and a roadway camera system interconnected to a central communication center. The tracking system has a system status website for a user interface.

14 Claims, 12 Drawing Sheets

TRACKING SYSTEM

CROSS REFERENCE

This application claims priority to U.S. Patent Application No. 61/824,049, filed May 16, 2013, the specification (s) of which is/are incorporated herein in their entirety by reference.

BACKGROUND OF THE INVENTION

There are a variety of technologies used in tracking systems including global positioning system (GPS), cellular phone systems, and radio frequency identification technologies. The GPS is a space-based satellite navigation system that provides location and time information anywhere on the Earth when there is an unobstructed line of sight to four or more GPS satellites. A cellular network is a radio network distributed over land areas served by at least one fixed-location transceiver. When joined together these cells provide radio coverage over a wide geographic area. Radio-frequency identification (RFID) is the use of a wireless non-contact system that uses radio-frequency electromagnetic fields to transfer data from a tag attached to an object. The tag contains electronically stored information which can be read from up to several meters (yards) away. The present invention features a personal global tracking system having a clandestine tracking unit on a user operatively interfacing with a global tracking system infrastructure.

SUMMARY

The present invention features a personal global tracking system having a clandestine tracking unit on a user operatively interfacing with a global tracking system infrastructure. In some embodiments, the system comprises a compact waterproof tracking unit. In some embodiments, the tracking unit comprises tamper proof fasteners. In some embodiments, a microprocessor, a speaker, a microphone, a transceiver, a cellular phone component and a power supply are located within the tracking unit. In some embodiments, the microprocessor comprises a text messaging transmitting and receiving component. In some embodiments, the microprocessor comprises a voice recognition component. In some embodiments, the microprocessor comprises a fixed data storage component for encoding personal information. In some embodiments, the microprocessor comprises a timekeeping component.

In some embodiments, a tracking unit side wall comprises a power supply charging port, a rotating antenna having a cylindrical shape resembling a winding knob of a standard wristwatch, and a data storage component port for receiving a removable data storage component. In some embodiments, a tracking unit bottom surface comprises a unique barcode located thereon. In some embodiments, the tracking unit bottom surface comprises a body temperature sensor. In some embodiments, a tracking unit top surface comprises a power button, an alarm arming activation component, an alarm activation component, an auxiliary unit arming activation component, a first green light emitting diode, a second green light emitting diode, and a red light emitting diode, the light emitting diodes for indicating status of the system.

In some embodiments, the system comprises a facia, pivotally connected to the tracking unit top surface. In some embodiments, a facia top surface comprises a facia display. In some embodiments, the facia display is for displaying a clock or a stopwatch readout from the timekeeping component.

In some embodiments, the system comprises a locking tamper-proof wristband. In some embodiments, the wristband comprises an alarm activation component. In some embodiments, the wristband comprises a pulse sensor. In some embodiments, for operation, when the wristband is removed in an unauthorized manner, a silent alarm is triggered via the alarm activation component. In some embodiments, the pulse sensor transmits the pulse of a user to the microprocessor.

In some embodiments, the system comprises an auxiliary unit having a waterproof tracking unit and an access door. In some embodiments, the auxiliary unit comprises a microprocessor, a transceiver, a power supply, and a power switch with a keyed lock. In some embodiments the auxiliary unit comprises a power supply status indicator, a port for charging the power supply, a first green light emitting diode, a second green light emitting diode, and a red light emitting diode, the light emitting diodes for indicating status of the system.

In some embodiments, the system comprises a tracking system infrastructure having a cellular phone tower system, a global positioning satellite system, and a roadway camera system interconnected to a central communication center. In some embodiments, the tracking system comprises a system status website for use as a user interface.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1A:
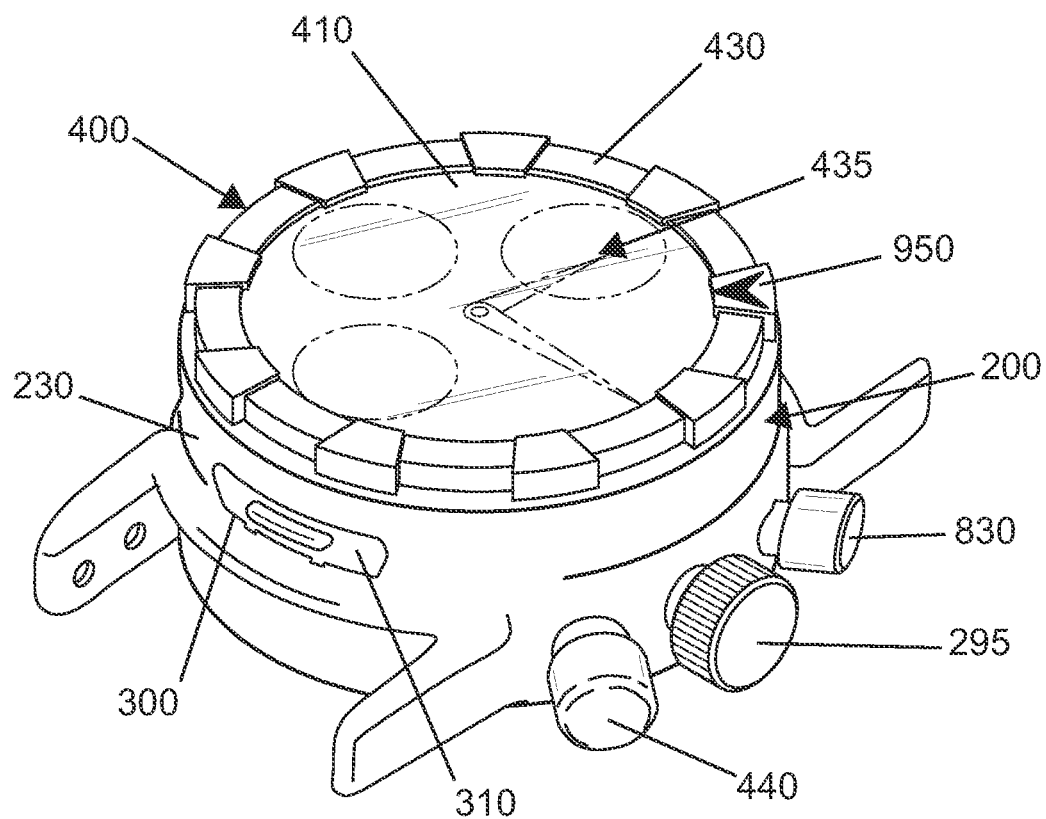
FIG. 1A is a perspective view of the tracking unit of the present invention.
Figure 1B:
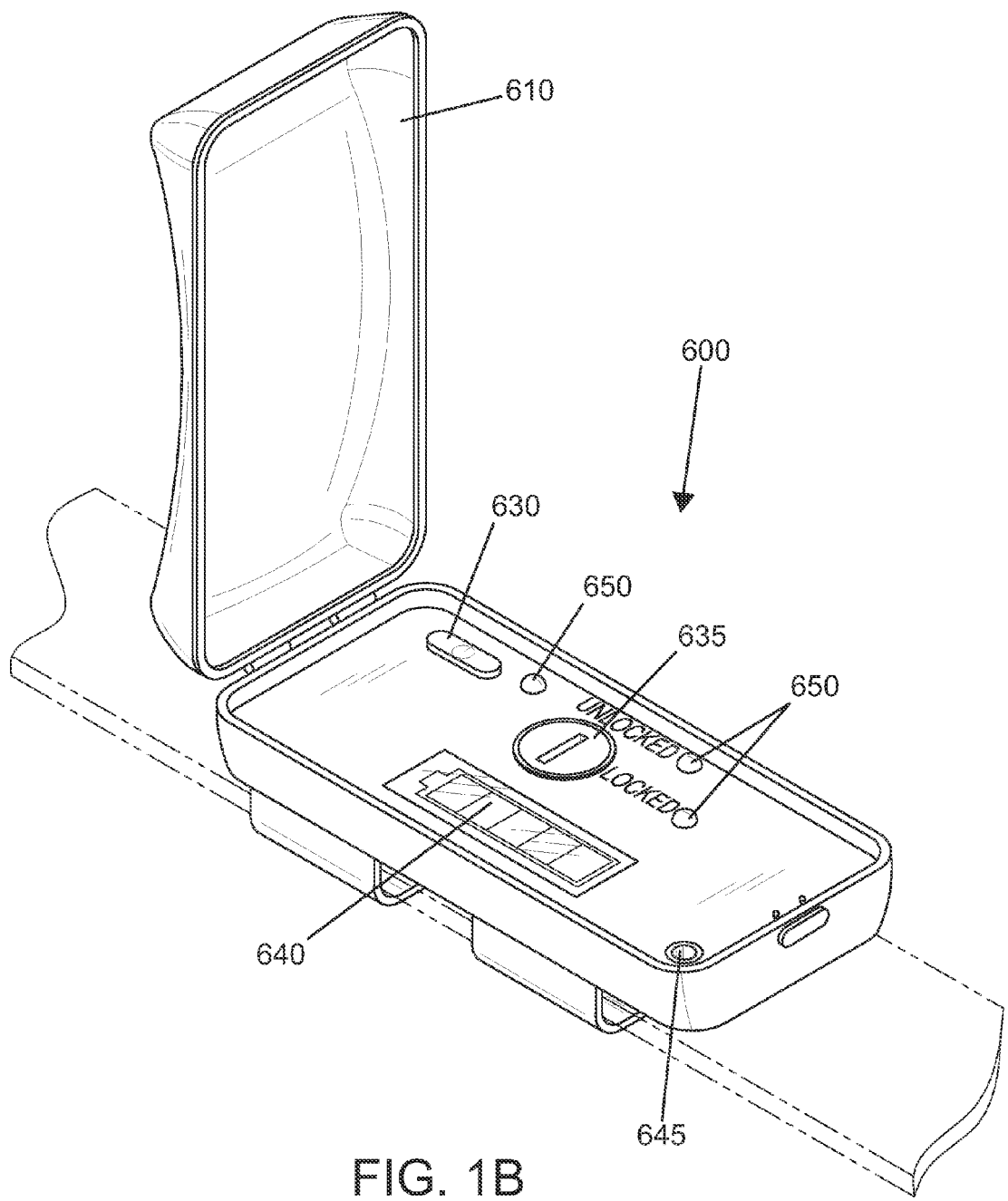
FIG. 1B is a perspective view of the auxiliary tracking unit of the present invention.
Figure 2:
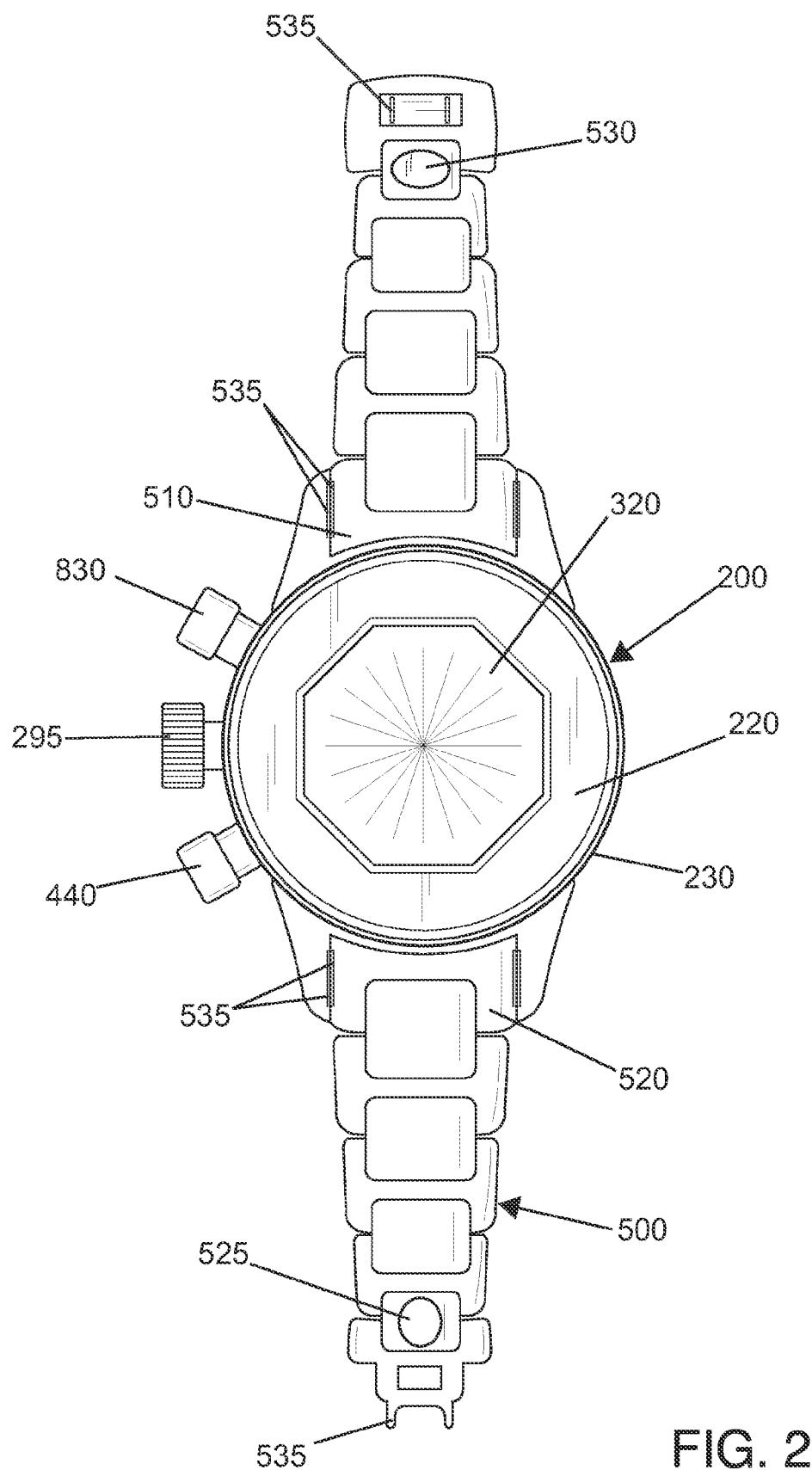
FIG. 2 is a bottom view of the tracking unit of the present invention.
Figure 3:
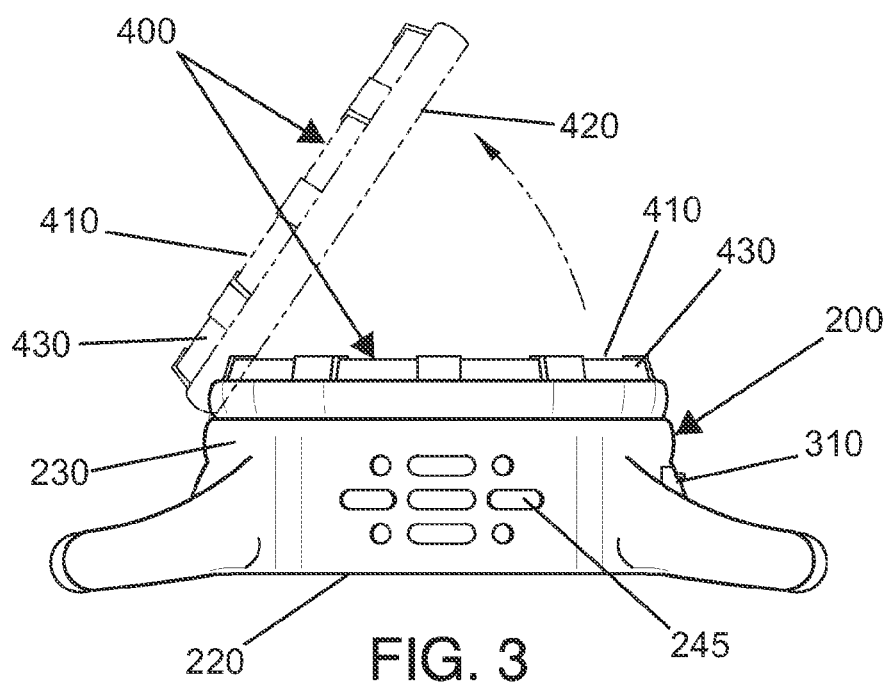
FIG. 3 is a side view of the tracking unit of the present invention.
Figure 4:
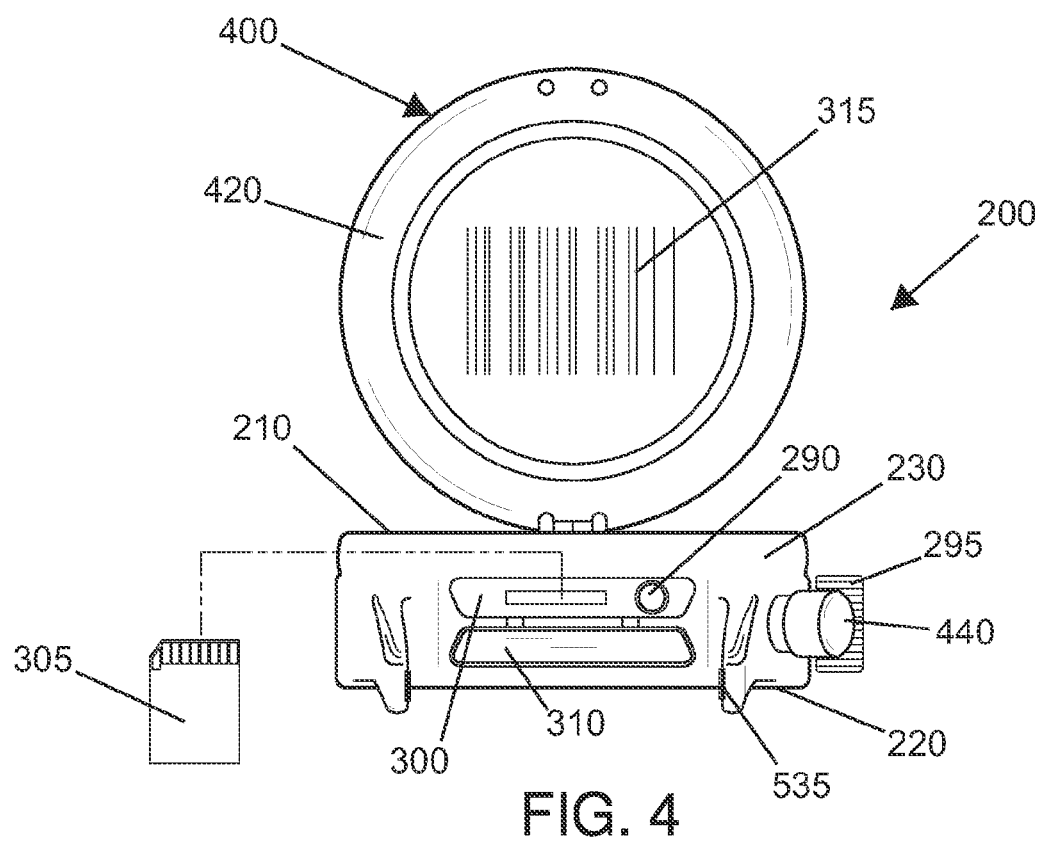
FIG. 4 is a back view of the tracking unit of the present invention.
Figure 5:
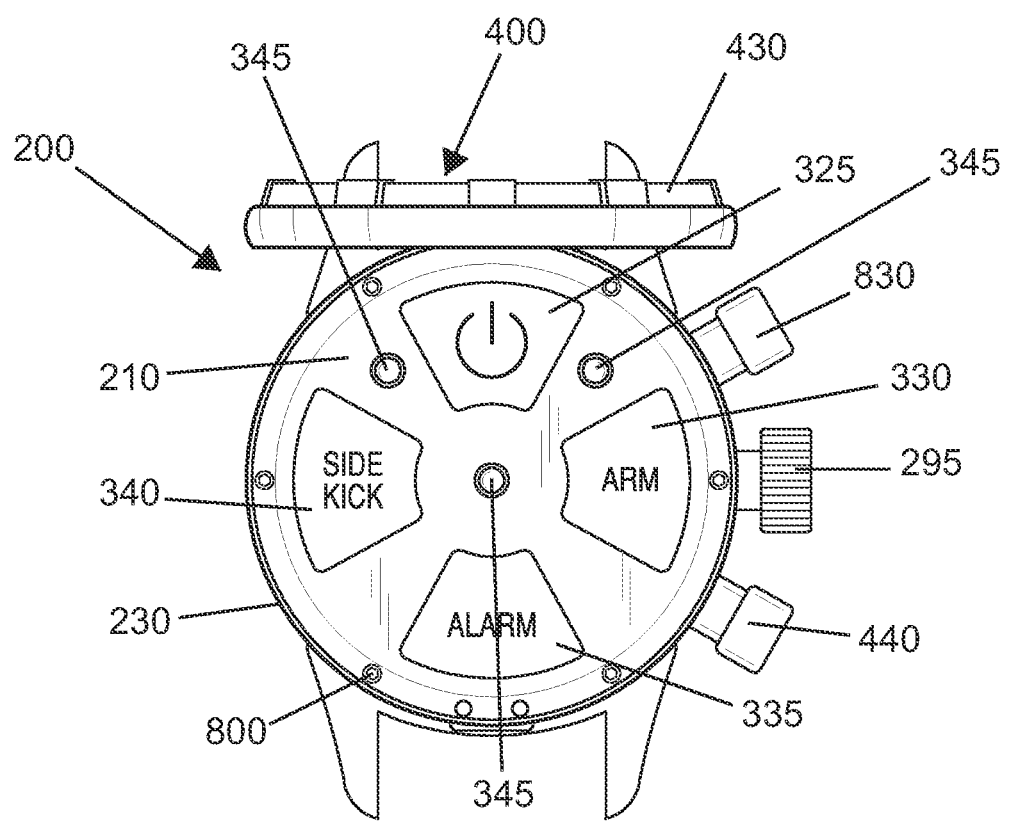
FIG. 5 is a top view of the tracking unit of the present invention.
Figure 6A:
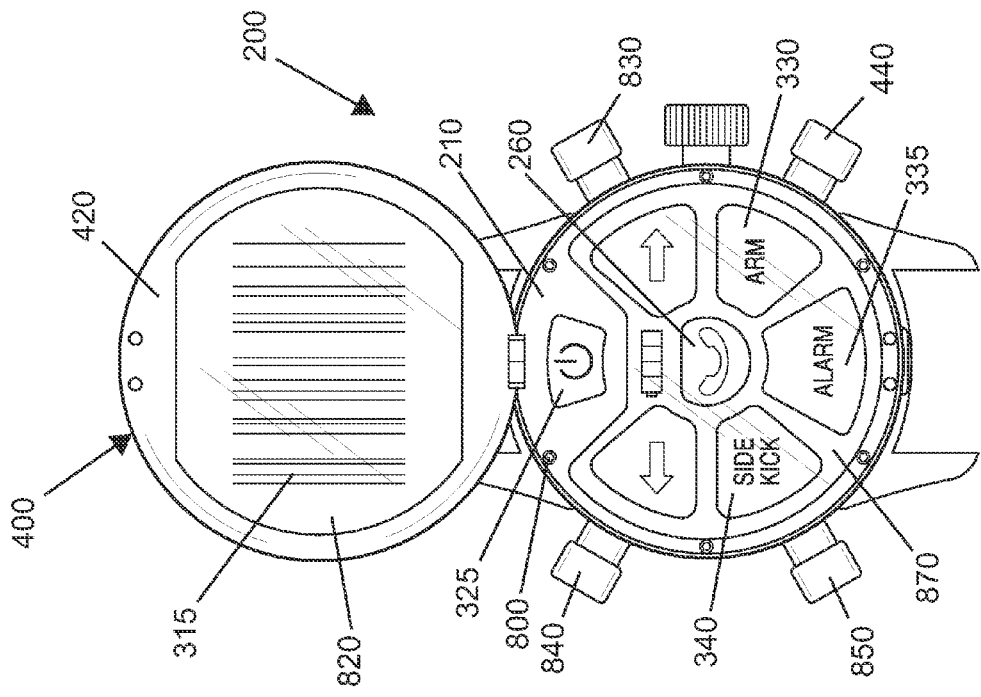
FIG. 6A is a top view of an alternate embodiment of the tracking unit of the present invention.
Figure 6B:
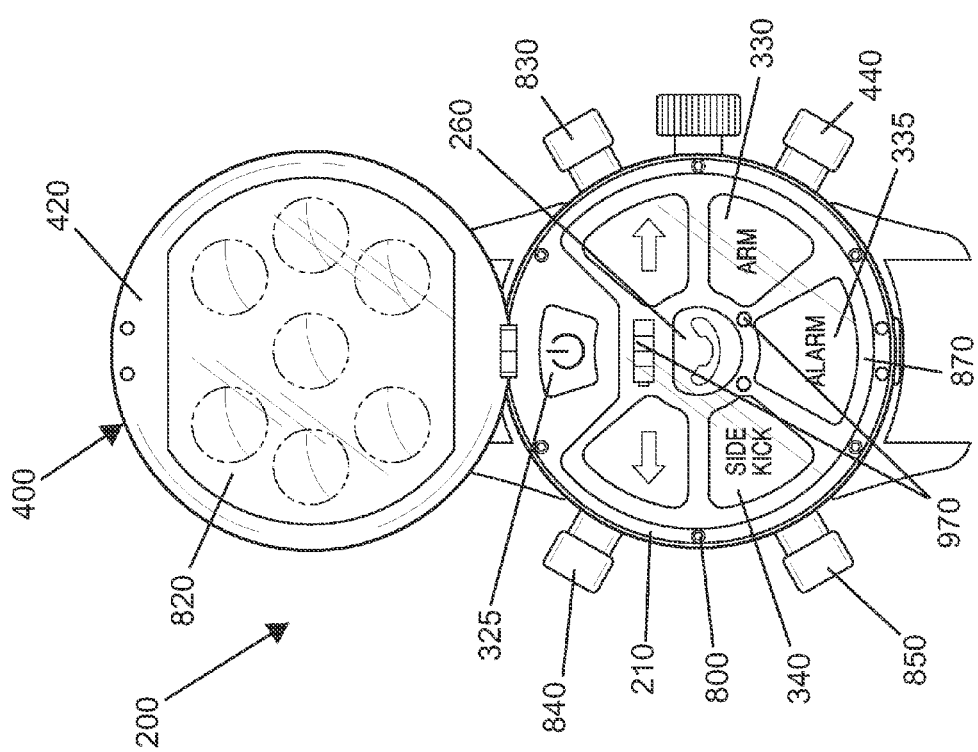
FIG. 6B is a top view of an alternate embodiment of the tracking unit of the present invention.
Figure 7:
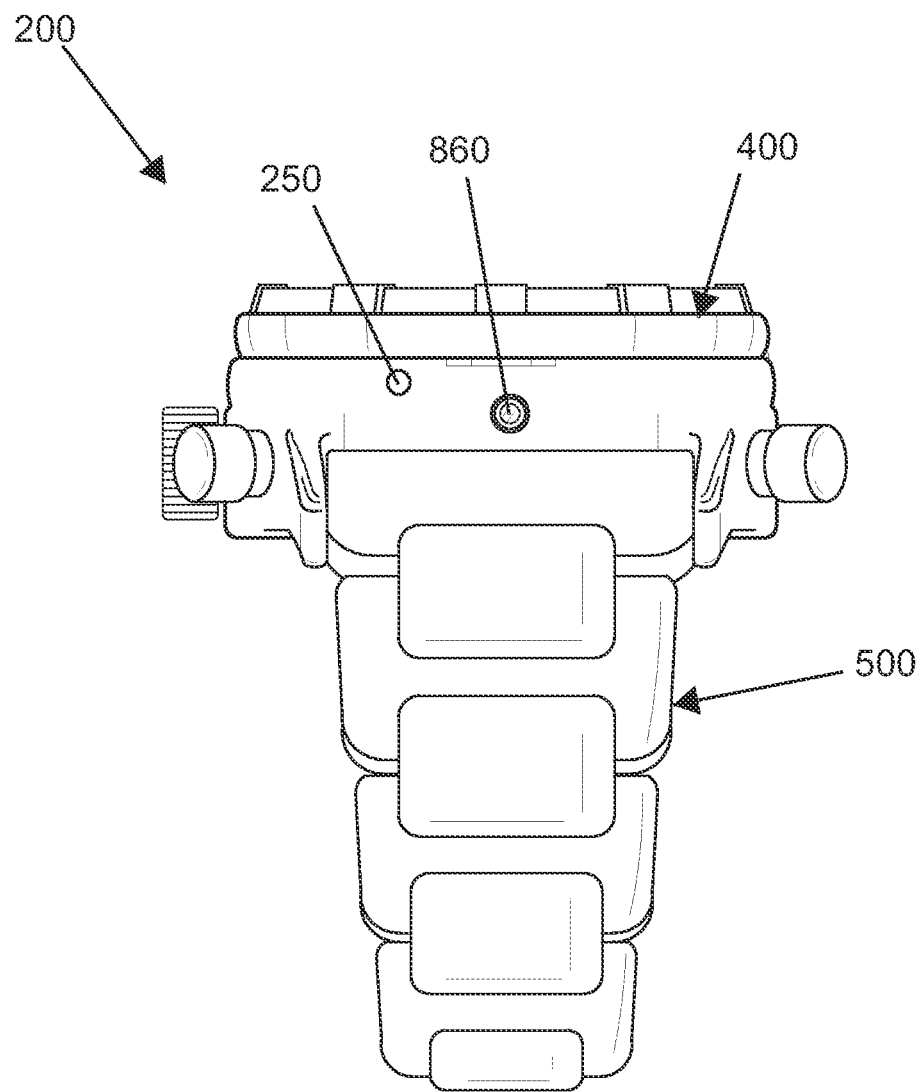
FIG. 7 is a front view of an alternate embodiment of the tracking unit of the present invention.
Figure 8:
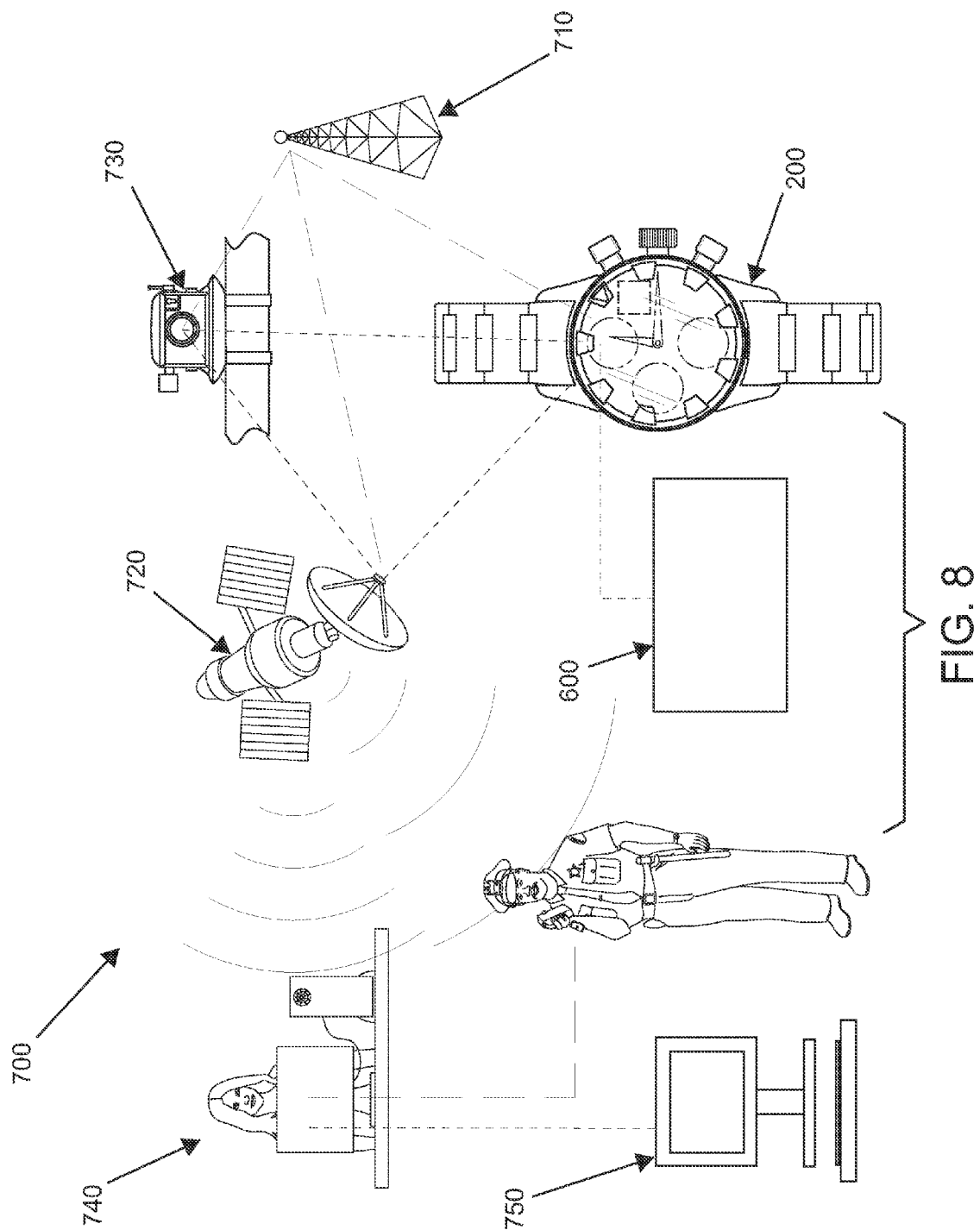
FIG. 8 is a schematic view of the present invention.
Figure 9:
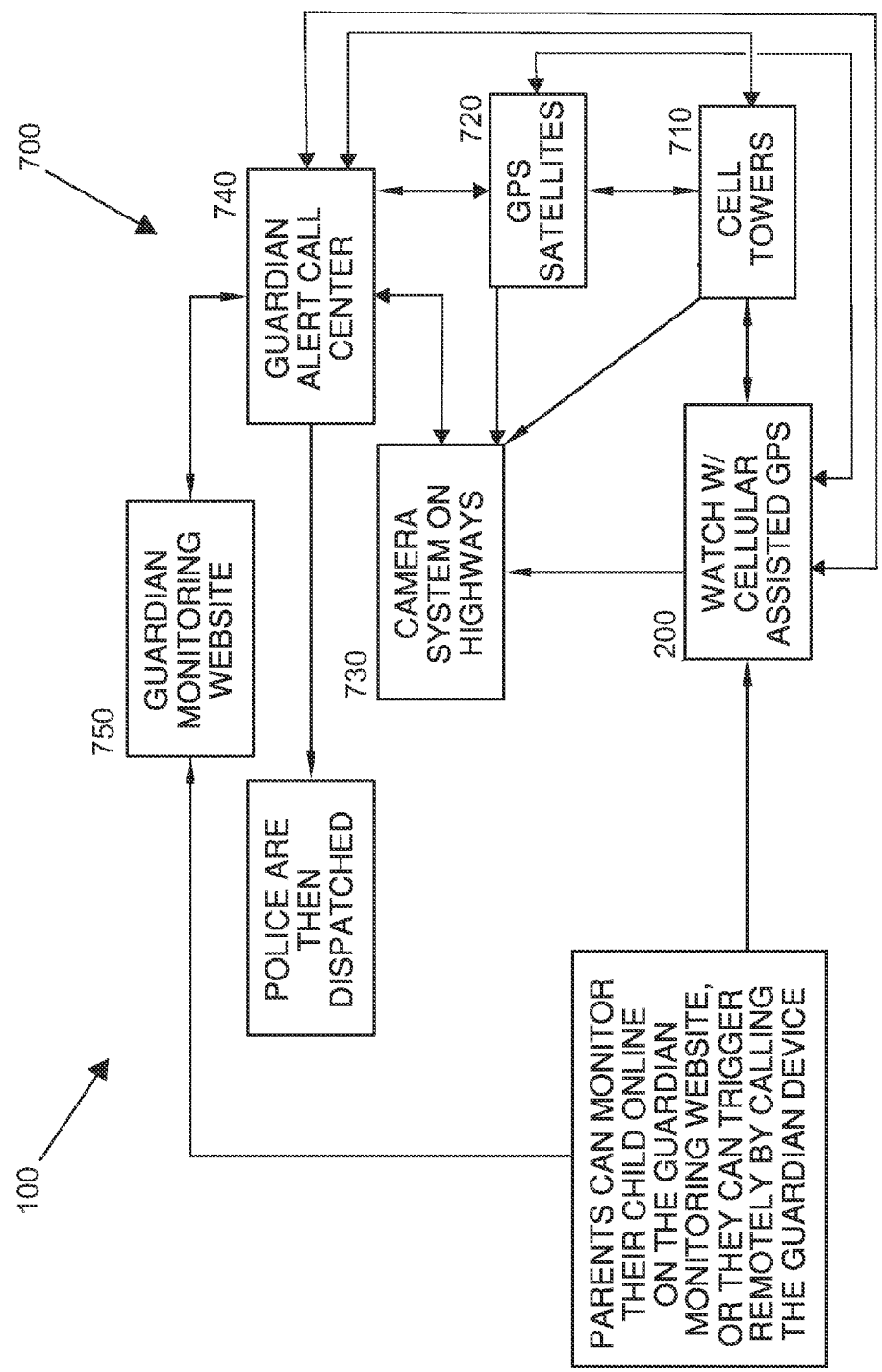
FIG. 9 is a schematic view of the present invention.
Figure 10:
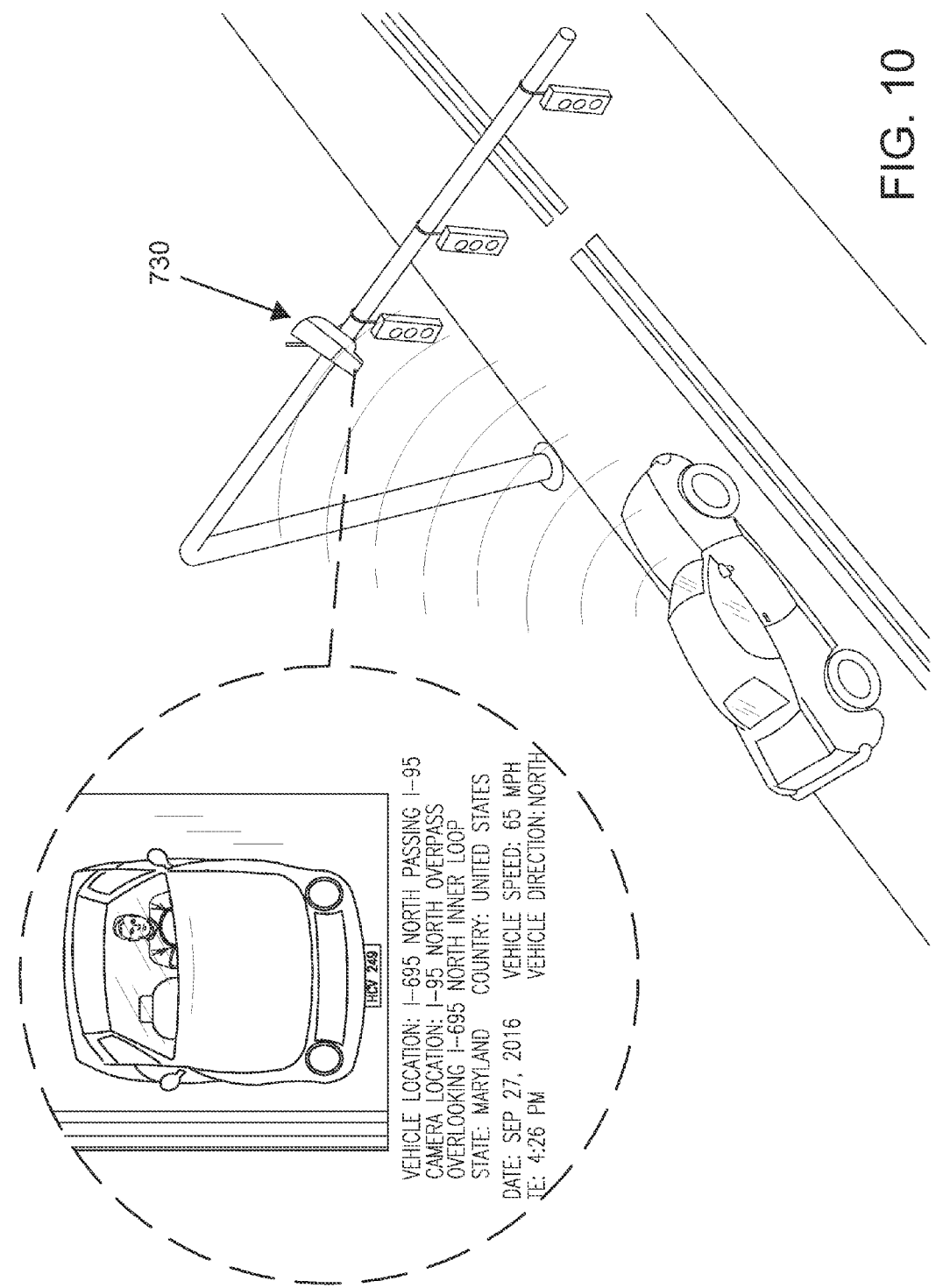
FIG. 10 is a view of the roadway camera system of the present invention.
Figure 11:
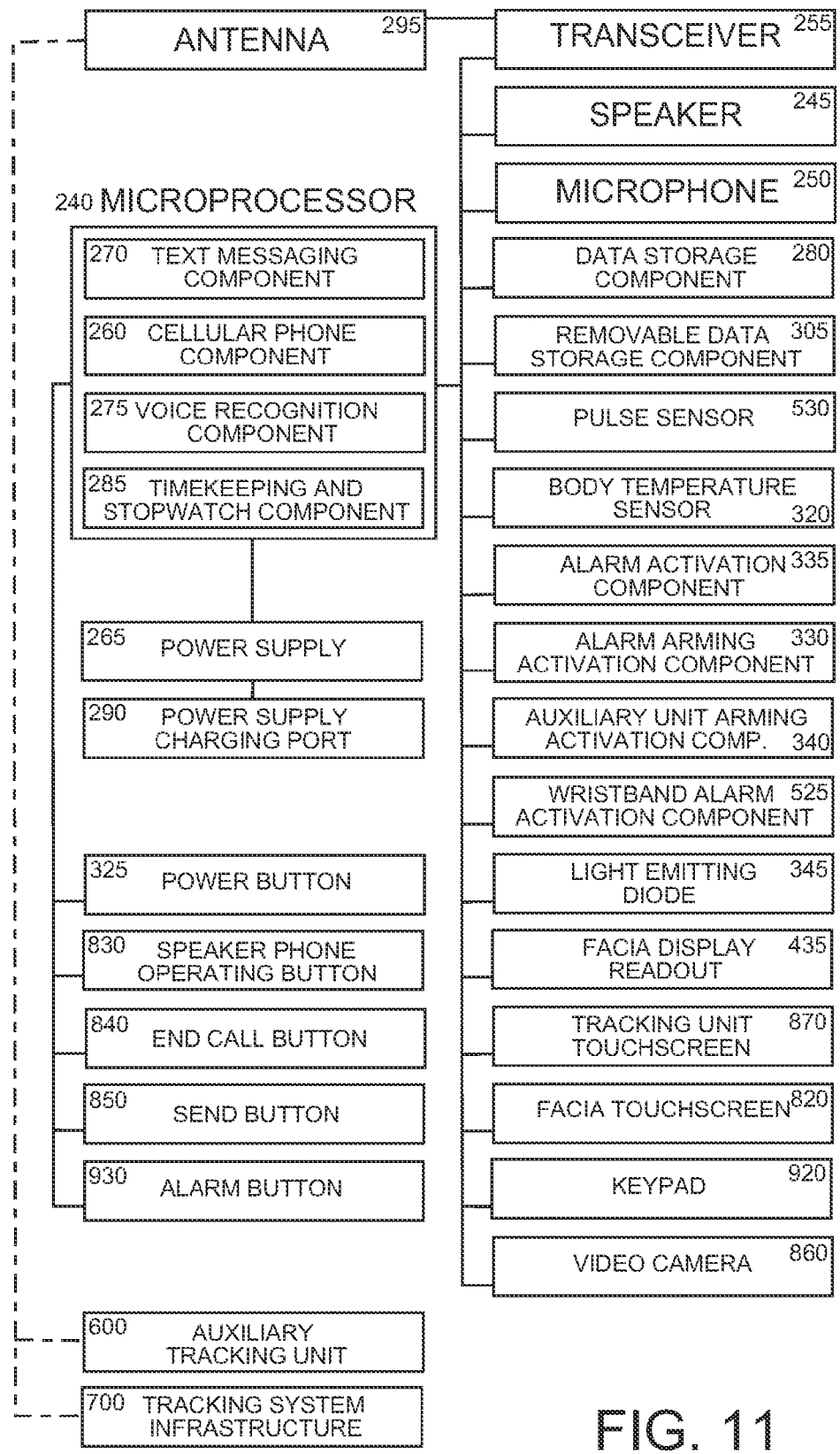
FIG. 11 is a schematic view of the tracking unit of the present invention.
Figure 12:
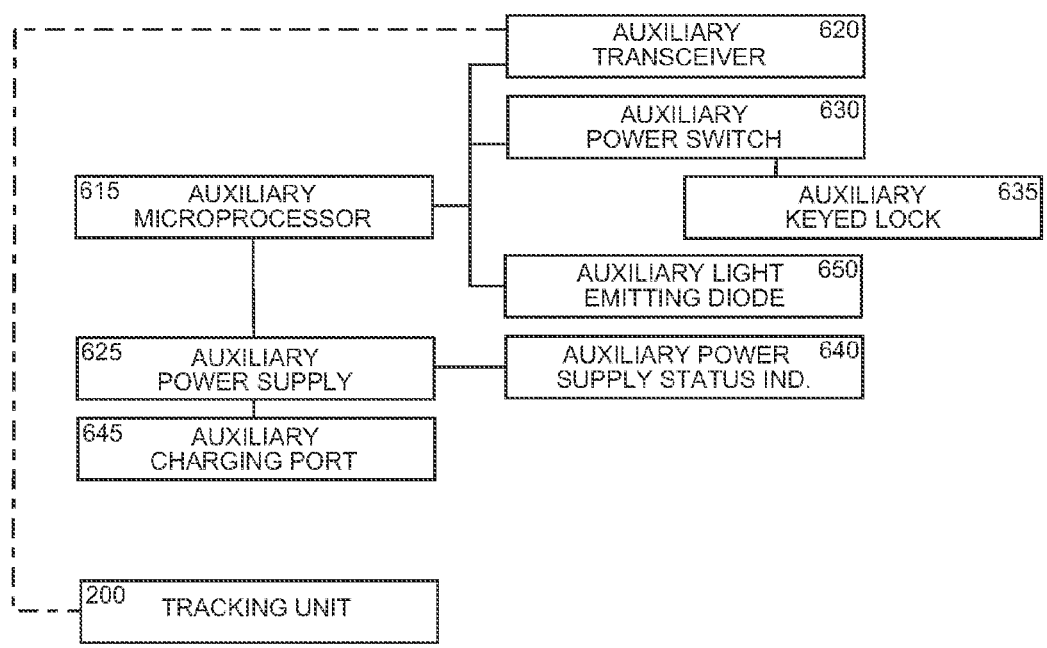
FIG. 12 is a schematic view of the auxiliary tracking unit of the present invention.

Following is a list of elements corresponding to a particular element referred to herein:

100 Personal global tracking system
200 Tracking unit
210 Tracking unit top surface
220 Tracking unit bottom surface
230 Tracking unit side wall
240 Microprocessor
245 Speaker
250 Microphone
255 Transceiver
260 Cellular phone component
265 Power supply
270 Text messaging component
275 Voice recognition component
280 Fixed data storage component
285 Timekeeping and stopwatch component
290 Power supply charging port
295 Antenna
300 Data storage component port
305 Removable data storage component
310 Hinged cap
315 Barcode
320 Body temperature sensor
325 Power button
330 Alarm arming activation component
335 Alarm activation component
340 Auxiliary unit arming activation component
345 Light emitting diode
400 Facia
410 Facia top surface
420 Facia bottom surface
430 Bezel
435 Display readout
440 Quick release button
500 Wristband
510 First wristband end
520 Second wristband end
525 Wristband alarm activation component
530 Pulse sensor
535 Contact
600 Auxiliary tracking unit
610 Auxiliary access door
615 Auxiliary microprocessor
620 Auxiliary transceiver
625 Auxiliary power supply
630 Auxiliary power switch
635 Auxiliary keyed lock
640 Auxiliary power supply status indicator
645 Auxiliary charging port
650 Auxiliary light emitting diode
700 Tracking system infrastructure
710 Cellular phone tower system
720 Global positioning satellite system
730 Roadway camera system
740 Central communication center
750 System status website
800 Tamper proof fastener
820 Facia touchscreen
830 Speaker phone operating button
840 End call button
850 Send button
860 Video camera
870 Tracking unit touchscreen
920 Keypad
930 Alarm button
950 Indicating arrow
970 Light indicator Referring now to FIG. 1A-12, the present invention features a personal global tracking system (100) having a clandestine tracking unit (200) worn by a first user operatively interfacing with a global tracking system infrastructure (700). In some embodiments, the system (100) comprises a compact waterproof tracking unit (200) having a tracking unit top surface (210), a tracking unit bottom surface (220), and a tracking unit side wall (230). In some embodiments, the tracking unit (200) comprises tamper proof fasteners (800). In some embodiments, the tracking unit (200) resembles a wristwatch. Wristwatches and their inherent mechanisms are well known to those with ordinary skill in the art.

In some embodiments, a microprocessor (240), a speaker (245), a microphone (250), a transceiver (255), a cellular phone component (260) and a power supply (265) are located within the tracking unit (200). In some embodiments, the speaker (245) is operatively connected to the microprocessor (240). In some embodiments, the speaker (245) is operatively connected to the cellular phone component (260). In some embodiments, the speaker (245) is for emitting an audible sound, such as an alarm, a status tone, a recorded sound, or a live voice from the microprocessor (240) or the cellular phone component (260). Cellular phone components (260) and their inherent technologies are well known to those with ordinary skill in the art.

In some embodiments, the microphone (250) is operatively connected to the microprocessor (240). In some embodiments, the microphone (250) is operatively connected to the cellular phone component (260). In some embodiments, the microphone (250) is for receiving an audible sound such as a live voice for use via the microprocessor (240) or the cellular phone component (260). Microphones and speakers their inherent mechanisms are well known to those with ordinary skill in the art.

In some embodiments, the transceiver (255) is operatively connected to the microprocessor (240). In some embodiments, the transceiver (255) is operatively connected to the cellular phone component (260). In some embodiments, the transceiver (255) is for sending and receiving radio signals. In some embodiments, the power supply (265) is operatively connected to the microprocessor (240). In some embodiments, the power supply (265) is operatively connected to the cellular phone component (260). Transceivers (radio transmitters and receivers) and their inherent technologies are well known to those with ordinary skill in the art.

In some embodiments, the microprocessor (240) comprises a text messaging component (270) located therein. In some embodiments, the text massaging component (270) is operatively connected to the cellular phone component (260). In some embodiments, text messages are sent and received via radio signals via the microprocessor (240), the cellular phone component (260) and the transceiver (255). Text messaging components (270) and their inherent technologies are well known to those with ordinary skill in the art.

In some embodiments, the microprocessor (240) comprises a voice recognition component (275) located therein. In some embodiments, the voice recognition component (275) receives an audio signal via the microphone (250) and converts the audio signal into a digital data file for processing via the microprocessor (240). In some embodiments, the microprocessor (240) comprises a fixed data storage component (280) located therein for encoding personal information and storing data. In some embodiments, the microprocessor (240) comprises a timekeeping and stopwatch component (285) located therein for use in keeping time In some embodiments, a female power supply charging port (290) operatively connected to the power supply (265) is located in the tracking unit side wall (230). In some embodiments, the power supply charging port (290) is for receiving a male end of a power supply charger. In some embodiments, an antenna (295) operatively connected to the transceiver (255) is rotationally located in the tracking unit side wall (230). In some embodiments, the antenna (295) comprises a cylindrical shape resembling a winding knob of a standard wristwatch. In some embodiments, the antenna (295) is for sending and receiving radio signals.

In some embodiments, a data storage component port (300) for receiving a removable data storage component (305) is located in the tracking unit side wall (230). In some embodiments, the data storage component port (300) comprises a waterproof hinged cap (310). In some embodiments, upon insertion, the removable data storage component (305) is operatively connected to the microprocessor (240). In some embodiments, the removable data storage component (305) is for storing data.

In some embodiments, a unique barcode (315) is located on the tracking unit bottom surface (220) or a facia bottom surface (420). In some embodiments, the barcode (315) is raised. In some embodiments, the unique barcode (315) is for encoding a unique serial number of the tracking unit (200). In some embodiments, a body temperature sensor (320) operatively connected to the microprocessor (240) is located on the tracking unit bottom surface (220). In some embodiments, the body temperature sensor (320) is for recording the body temperature of the first user and transmitting to the microprocessor (240).

In some embodiments, a power button (325) operatively connected to the microprocessor (240) is located on the tracking unit top surface (210). In some embodiments, the power button (325) is for enabling or disabling operating power to the tracking unit (200). In some embodiments, an alarm arming activation component (330) operatively connected to the microprocessor (240) is located on the tracking unit top surface (210). In some embodiments, an alarm activation component (335) operatively connected to the microprocessor (240) is located on the tracking unit top surface (210). In some embodiments, an auxiliary unit arming activation component (340) operatively connected to the microprocessor (240) is located on the tracking unit top surface (210). In some embodiments, the alarm arming activation component (330) is for enabling and disabling the silent alarm. In some embodiments, the alarm activation component (335) is for activating or deactivating the silent alarm. In some embodiments, the auxiliary unit arming activation component (340) is for enabling and disabling an auxiliary tracking unit (600).

In some embodiments, a first green light emitting diode (345) for indicating an active state of the system (100) and additionally, when flashing, a charging state of the power supply (265) is located on the tracking unit top surface (210). In some embodiments, a second green light emitting diode (345) for indicating an active state of the auxiliary tracking unit (600) is located on the tracking unit top surface (210). In some embodiments, a red light emitting diode (345) for indicating an active state of the silent alarm is located on the tracking unit top surface (210).

In some embodiments, the system (100) comprises a facia (400), pivotally connected to the tracking unit top surface (210) having a facia top surface (410), the facia bottom surface (420), and a bezel (430). In some embodiments, the facia (400) is pivotally located on the tracking unit top surface (210) via a hinge.

In some embodiments, the facia top surface (410) comprises a display readout (435). In some embodiments, the display readout (435) is for displaying an output from the timekeeping and stopwatch component (285), a picture, or alphanumeric message from the operatively connected microprocessor (240). Display readouts (435) and their associated technologies (light emitting diode display, liquid crystal display, etc.) are well known to those of ordinary skill in the art.

In some embodiments, a quick release button (440) for releasing the spring biased, pivoting fascia (400) from a closed position to an open position is located on the tracking unit side wall (230) close to the antenna (295). In some embodiments, the fascia (400) is pushed into a closed position and held in place via a latch that is connected to the quick release button (440).

In some embodiments, the system (100) comprises a locking tamper-proof wristband (500) having a first wristband end (510) located on the tracking unit side wall (230) and a second wristband end (520) located on an opposing tracking unit side wall (230). In some embodiments, the wristband (500) comprises a wristband alarm activation component (525) located thereon operatively connected to the microprocessor (240). In some embodiments, the wristband (500) comprises a pulse sensor (530) located thereon operatively connected to the microprocessor (240). In some embodiments the wristband (500) comprises a hasp. Wristbands and their associated technologies are well known to those of ordinary skill in the art.

In some embodiments, the locking wristband (500) comprises contacts (535) located thereon for interfacing with a matched set of contacts (535) located on the tracking unit (200). In some embodiments, the contacts (535) located on the tracking unit (200) are operatively connected to the microprocessor (240).

In some embodiments, for operation, when the wristband (500) is removed in an unauthorized manner, a silent alarm is triggered via the wristband alarm activation component (525). In some embodiments, the pulse sensor (530) monitors the pulse of a user and transmits a signal to the microprocessor (240).

In some embodiments, the system (100) comprises a waterproof auxiliary tracking unit (600) having an auxiliary access door (610) pivotally located thereon. In some embodiments, the auxiliary tracking unit (600) comprises an auxiliary microprocessor (615), an auxiliary transceiver (620) operatively connected to the auxiliary microprocessor (615), and an auxiliary power supply (625) operatively connected to the auxiliary microprocessor (615) located therein. In some embodiments, the auxiliary tracking unit (600) comprises an auxiliary power switch (630) having a auxiliary keyed lock (635) operatively connected to the auxiliary microprocessor (615) located thereon. In some embodiments, the auxiliary keyed lock (635) is for enabling and disabling the auxiliary power switch (630). In some embodiments, the auxiliary transceiver (620) transmits and receives signals from the transceiver (255). In some embodiments, the auxiliary tracking unit (600) is worn around the user via a belt.

In some embodiments, the auxiliary tracking unit (600) comprises a auxiliary power supply status indicator (640) located thereon operatively connected to the auxiliary power supply (630). In some embodiments, the auxiliary tracking unit (600) comprises a female auxiliary charging port (645) located thereon operatively connected to the auxiliary power supply (630) for charging the auxiliary power supply (630) via a male power supply charger. In some embodiments, the auxiliary tracking unit (600) comprises a first green auxiliary light emitting diode (650) located thereon for indicating operating status of the auxiliary tracking unit (600). In some embodiments, the auxiliary tracking unit (600) comprises a second green auxiliary light emitting diode (650) located thereon for indicating enabled, unlocked status of the auxiliary power switch (630). In some embodiments, the auxiliary tracking unit (600) comprises a red auxiliary light emitting diode (650) indicating disabled, locked status of the auxiliary power switch (630).

In some embodiments, for operation the auxiliary tracking unit (600) is located within a specific distance from the tracking unit (200) and worn by the first user. For example, a distance of 5 feet. For example, a distance of 4 feet. For example, a distance of 6 feet. In some embodiments, when the auxiliary tracking unit (600) is located at a distance greater than the specific distance from the tracking unit (200), a silent alarm is triggered.

In some embodiments, the system (100) comprises a tracking system infrastructure (700) comprising a cellular phone tower system (710), a global positioning satellite system (720), and a roadway camera system (730). In some embodiments, the cellular phone tower system (710), global positioning satellite system (720), and roadway camera system (730) are interconnected to a central communication center (740). In some embodiments, the tracking system comprises a system status website (750) for use as an interface for a second user.

In some embodiments, upon activation, the silent alarm is sounded via the first user activating the alarm activation component (335), the first user issuing a voice command through the microphone (250) to the voice recognition component (275) located in the microprocessor (240), a second user activating the cellular phone component (260) via dialing the unique cellular phone number, or predetermined set of parameters located in the microprocessor (240), the data storage component (280), or the removable data storage component (305) is met.

Cellular phone tower systems (710) and their associated mechanisms and technologies are well known to those of ordinary skill in the art. The global positioning satellite system (720) and its associated mechanisms and technologies are well known to those of ordinary skill in the art. Roadway camera systems (730) and their associated mechanisms and technologies are well known to those of ordinary skill in the art. Interactive system status websites (750) are well known to those of ordinary skill in the art.

In some embodiments, the tracking unit (200) transmits a signal to the tracking system infrastructure (700) via the transceiver (255). In some embodiments, upon activation, the signal is received via the cellular phone tower system (710), roadway camera system (730), and the global positioning satellite system (720). In some embodiments, upon activation, the cellular phone tower system (710) transmits a location signal to the central communication center (740). In some embodiments, upon activation, the global positioning satellite system (720) transmits a location signal to the central communication center (740). In some embodiments, upon activation, the roadway camera system (730) captures video or a still image. In some embodiments, upon activation, the roadway camera system (730) transmits the video or still image to the central communication center (740). In some embodiments, upon activation, the central communication center (740) transmits a signal to the system status website (750) for interactive viewing and use for the second user.

In some embodiments, the silent alarm is activated at the central communication center (740).

In some embodiments, the system (100) comprises a keychain having the unique barcode (315) located thereon. In some embodiments, the system (100) comprises an identification card having the unique barcode (315) located thereon.

In some embodiments, the facia bottom surface (420) comprises a facia touchscreen (820) located thereon. In some embodiments, the facia touchscreen (820) is operatively connected to the microprocessor (240). In some embodiments, the facia touchscreen (820) is for inputting data into the microprocessor (240). In some embodiments, the facia touchscreen (820) is for displaying data from the microprocessor (240) including the barcode (315). Touchscreens are well known to those of ordinary skill in the art.

In some embodiments, the tracking unit (200) comprises a speaker phone operating button (830), an end call button (840), and a send button (850) located thereon operatively connected to the microprocessor (240) and the cellular phone component (260).

In some embodiments, the tracking unit (200) comprises a video camera (860) located thereon operatively connected to the microprocessor (240). Video cameras are well know to those of ordinary skill in the art.

In some embodiments, the tracking unit top surface (210) comprises a tracking unit touchscreen (870) located thereon operatively connected to the microprocessor (240). In some embodiments, the tracking unit touchscreen (870) comprises the alarm arming activation component (330) operatively connected to the microprocessor (240), the alarm activation component (335) operatively connected to the microprocessor (240), and the auxiliary unit arming activation component (340) operatively connected to the microprocessor (240). In some embodiments, the tracking unit touchscreen (870) comprises a first green light indicator (970) for indicating status of the system (100) and charging of the power supply (265), a second green light indicator (970) for indicating status of the auxiliary tracking unit (600), and a red light indicator (970) for indicating status of the silent alarm operatively connected to the microprocessor (240). In some embodiments, the tracking unit touchscreen (870) is for inputting data into the microprocessor (240). In some embodiments, the tracking unit touchscreen (870) is for displaying data from the microprocessor (240) including the barcode (315).

In some embodiments, the tracking unit top surface (210) comprises a decorative cover located thereon.

In some embodiments, the facia top surface (410) comprises a decorative cover located thereon.

In some embodiments, the system (100) comprises a keypad (920) located on the facia bottom surface (420). In some embodiments, the keypad (920) is operatively connected to the microprocessor (240). In some embodiments, the keypad (920) is for entering data into the microprocessor (240).

In some embodiments, the system (100) comprises a manually activating silent alarm button (930) located on the tracking unit (200) operatively connected to the microprocessor (240).

In some embodiments, the auxiliary tracking unit (600) is clandestinely located in an article of jewelry, for example, a charm, a necklace, a bracelet, or earrings.

In some embodiments, the auxiliary tracking unit (600) comprises a radio frequency identification chip.

In some embodiments, the facia (400) comprises a rotating bezel (430) located thereon. In some embodiments, the rotating bezel (430) comprises an indicating arrow (950) for use in combination with numbers on the watch display as a combination lock for unlocking the locking wristband (500). In some embodiments, the bezel (430) comprises the rotating combination lock for unlocking the locking wristband (500). Combination locks and their associated technology are well known to those of ordinary skill in the art.

In some embodiments, the antenna (295) is operatively connected to the microprocessor (240) for adjusting the timekeeping component.

As used herein, the term "about" refers to plus or minus 10% of the referenced number. For example, an embodiment wherein the tracking unit is about 10 inches in length includes a tracking unit that is between 9 and 11 inches in length.

The disclosures of the following U.S. patents are incorporated in their entirety by reference herein: U.S. Pat. No. D 520,393; U.S. Pat. Pub. No. 2010/0262367; U.S. Pat. Pub. No. 2007/0252690; U.S. Pat. Pub. No. 2007/0200695; U.S. Pat. Pub. No. 2006/0287872; U.S. Pat. No. 6,243,039; U.S. Pat. No. 5,812,056.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A personal global tracking system (100) having a clandestine tracking unit (200) worn by a first user operatively interfacing with a global tracking system infrastructure (700), wherein said system (100) comprises:

(a) a compact waterproof tracking unit (200) having a tracking unit top surface (210), a tracking unit bottom surface (220), and a tracking unit side wall (230), wherein the tracking unit (200) comprises tamper proof fasteners (800), wherein a microprocessor (240), a speaker (245), a microphone (250), a transceiver (255), a cellular phone component (260), and a power supply (265) are disposed within the tracking unit (200), wherein the speaker (245) is operatively connected to the microprocessor (240), wherein the speaker (245) is operatively connected to the cellular phone component (260), wherein the speaker (245) is for emitting an audible sound such as an alarm, a status tone, a recorded sound, or a live voice from the microprocessor (240) or the cellular phone component (260), wherein the microphone (250) is operatively connected to the microprocessor (240), wherein the microphone (250) is operatively connected to the cellular phone component (260), wherein the microphone (250) is for receiving an audible sound such as a live voice for processing via the microprocessor (240) or the cellular phone component (260), wherein the transceiver (255) is operatively connected to the microprocessor (240), wherein the transceiver (255) is operatively connected to the cellular phone component (260), wherein the transceiver (255) is for sending and receiving radio signals, wherein the power supply (265) is operatively connected to the microprocessor (240), wherein the power supply (265) is operatively connected to the cellular phone component (260), wherein the microprocessor (240) comprises a text messaging component (270) disposed therein, wherein the text massaging component (270) is operatively connected to the cellular phone component (260), wherein text messages are sent and received via radio signals via the microprocessor (240), the cellular phone component (260) and the transceiver (255), wherein the microprocessor (240) comprises a voice recognition component (275) disposed therein, wherein the voice recognition component receives an audio signal via the microphone (250) and converts the audio signal into a data file for processing via the microprocessor (240), wherein the microprocessor (240) comprises a fixed data storage component (280) disposed therein for encoding personal information and storing data, wherein the microprocessor (240) comprises a timekeeping and stopwatch component (285) disposed therein for use in keeping time, wherein a female power supply charging port (290) operatively connected to the power supply (265) is disposed in the tracking unit side wall (230), wherein the power supply charging port (290) is for receiving a male end of a power supply charger, wherein an antenna (295) operatively connected to the transceiver (255) is rotationally disposed in the tracking unit side wall (230), wherein the antenna (295) comprises a cylindrical shape resembling a winding knob of a standard wristwatch, wherein the antenna (295) is for sending and receiving radio signals, wherein a data storage component port (300) for receiving a removable data storage component (305) is disposed in the tracking unit side wall (230), wherein the data storage component port (300) comprises a waterproof hinged cap (310), wherein upon insertion, the removable data storage component (305) is operatively connected to the microprocessor (240), wherein the removable data storage component (305) is for storing data, wherein a unique barcode (315) is disposed on the tracking unit bottom surface (220) or a facia bottom surface (420), wherein the unique barcode (315) is for encoding a unique serial number of the tracking unit (200), wherein a body temperature sensor (320) operatively connected to the microprocessor (240) is disposed on the tracking unit bottom surface (220), wherein the body temperature sensor (320) is for recording the body temperature of the first user and transmitting to the microprocessor (240), wherein a power button (325) operatively connected to the microprocessor (240) is disposed on the tracking unit top surface (210), wherein the power button (325) is for enabling or disabling operating power to the tracking unit (200), wherein an alarm arming activation component (330) operatively connected to the microprocessor (240) is disposed on the tracking unit top surface (210), wherein an alarm activation component (335) operatively connected to the microprocessor (240) is disposed on the tracking unit top surface (210), wherein an auxiliary unit arming activation component (340) operatively connected to the microprocessor (240) is disposed on the tracking unit top surface (210), wherein the alarm arming activation component (330) is for enabling and disabling the silent alarm, wherein the alarm activation component (335) is for activating or deactivating the silent alarm, wherein the auxiliary unit arming activation component (340) is for enabling and disabling an auxiliary tracking unit (600), wherein a first green light emitting diode (345) for indicating an active state of the system (100) and additionally a charging state of the power supply (265) is disposed on the tracking unit top surface (210), wherein a second green light emitting diode (345) for indicating an active state of the auxiliary tracking unit (600) is disposed on the tracking unit top surface (210), wherein a red light emitting diode (345) for indicating an active state of the silent alarm is disposed on the tracking unit top surface (210);

(b) a facia (400), pivotally connected to the tracking unit top surface (210) having a facia top surface (410), the facia bottom surface (420), and a bezel (430), wherein the facia (400) is pivotally disposed on the tracking unit top surface (210), wherein the facia top surface (410) comprises a display readout (435), wherein the display readout (435) is for displaying an output from the timekeeping and stopwatch component (285), a picture, or alphanumeric message from the operatively connected microprocessor (240), wherein a quick release button (440) for releasing the spring biased, pivoting fascia (400) from a closed position to an open position is disposed on the tracking unit side wall (230) proximal to the antenna (295);

(c) a locking tamper-proof wristband (500) having a first wristband end (510) disposed on the tracking unit side wall (230) and a second wristband end (520) disposed on an opposing tracking unit side wall (230), wherein the wristband (500) comprises a wristband alarm activation component (525) disposed thereon operatively connected to the microprocessor (240), wherein the wristband (500) comprises a pulse sensor (530) disposed thereon operatively connected to the microprocessor (240), wherein the locking wristband (500) comprises contacts (535) disposed thereon for interfacing with a matched set of contacts (535) disposed on the tracking unit (200), wherein the contacts (535) disposed on the tracking unit (200) are operatively connected to the microprocessor (240), wherein for operation, when the wristband (500) is removed in an unauthorized manner, a silent alarm is triggered via the wristband alarm activation component (525), wherein the pulse sensor (530) monitors the pulse of a user and transmits a signal to the microprocessor (240);

(d) a waterproof auxiliary tracking unit (600) having an auxiliary access door (610) pivotally disposed thereon, wherein the auxiliary tracking unit (600) comprises an auxiliary microprocessor (615), an auxiliary transceiver (620) operatively connected to the auxiliary microprocessor (615), and an auxiliary power supply (625) operatively connected to the auxiliary microprocessor (615) disposed therein, wherein the auxiliary tracking unit (600) comprises an auxiliary power switch (630) having a auxiliary keyed lock (635) operatively connected to the auxiliary microprocessor (615) disposed thereon, wherein the auxiliary keyed lock (635) is for enabling and disabling the auxiliary power switch (630), wherein the auxiliary transceiver (620) transmits and receives signals from the transceiver (255), wherein the auxiliary tracking unit (600) comprises a auxiliary power supply status indicator (640) disposed thereon operatively connected to the auxiliary power supply (630), wherein the auxiliary tracking unit (600) comprises a female auxiliary charging port (645) disposed thereon operatively connected to the auxiliary power supply (630) for charging the auxiliary power supply (630) via a male power supply charger, wherein the auxiliary tracking unit (600) comprises a first green auxiliary light emitting diode (650) disposed thereon for indicating operating status of the auxiliary tracking unit (600), wherein the auxiliary tracking unit (600) comprises a second green auxiliary light emitting diode (650) disposed thereon for indicating enabled, unlocked status of the auxiliary power switch (630), wherein the auxiliary tracking unit (600) comprises a red auxiliary light emitting diode (650) indicating disabled, locked status of the auxiliary power switch (630), wherein for operation the auxiliary tracking unit (600) is disposed within a specific distance from the tracking unit (200) and worn by the first user, wherein when the auxiliary tracking unit (600) is disposed at a distance greater than the specific distance from the tracking unit (200), a silent alarm is triggered; and (e) a tracking system infrastructure (700) comprising a cellular phone tower system (710), a global positioning satellite system (720), and a roadway camera system (730), wherein the cellular phone tower system (710), global positioning satellite system (720), and roadway camera system (730) are interconnected to a central communication center (740), wherein in the tracking system comprises a system status website (750) for use as an interface for a second user, wherein upon activation, the silent alarm is sounded via the first user activating the alarm activation component (335), the first user issuing a voice command through the microphone (250) to the voice recognition component (275) disposed in the microprocessor (240), a second user activating the cellular phone component (260) via dialing the unique cellular phone number, or predetermined set of parameters disposed in the microprocessor (240), the data storage component (280), or the removable data storage component (305) is met, wherein the tracking unit (200) transmits a signal to the tracking system infrastructure (700) via the transceiver (255), wherein upon activation, the signal is received via the cellular phone tower system (710), roadway camera system (730), and the global positioning satellite system (720), wherein upon activation, the cellular phone tower system (710) transmits a location signal to the central communication center (740), wherein upon activation, the global positioning satellite system (720) transmits a location signal to the central communication center (740), wherein upon activation, the roadway camera system (730) captures video or a still image, wherein upon activation, the roadway camera system (730) transmits the video or still image to the central communication center (740), wherein upon activation, the central communication center (740) transmits a signal to the system status website (750) for interactive viewing and use for the second user.

2. The system (100) of claim 1, wherein the system (100) comprises a keychain having the unique barcode (315) disposed thereon.

3. The system (100) of claim 1, wherein the facia bottom surface (420) comprises a facia touchscreen (820) disposed thereon, wherein the facia touchscreen (820) is operatively connected to the microprocessor (240), wherein the facia touchscreen (820) is for inputting data into the microprocessor (240), wherein the facia touchscreen (820) is for displaying data from the microprocessor (240) including the barcode (315).

4. The system (100) of claim 1, wherein the tracking unit (200) comprises a speaker phone operating button (830), an end call button (840), and a send button (850) disposed thereon operatively connected to the microprocessor (240) and the cellular phone component (260).

5. The system (100) of claim 1, wherein the tracking unit (200) comprises a video camera (860) disposed thereon operatively connected to the microprocessor (240).

6. The system (100) of claim 1, wherein the wherein the tracking unit top surface (210) comprises a tracking unit touchscreen (870) disposed thereon operatively connected to the microprocessor (240), wherein the tracking unit touchscreen (870) comprises the alarm arming activation component (330) operatively connected to the microprocessor (240), the alarm activation component (335) operatively connected to the microprocessor (240), and the auxiliary unit arming activation component (340) operatively connected to the microprocessor (240), wherein the tracking unit touchscreen (870) comprises a first green light indicator (970) for indicating status of the system (100) and charging of the power supply (265), a second green light indicator (970) for indicating status of the auxiliary tracking unit (600), and a red light indicator (970) for indicating status of the silent alarm operatively connected to the microprocessor (240) wherein the tracking unit touchscreen (870) is for inputting data into the microprocessor (240), wherein the tracking unit touchscreen (870) is for displaying data from the microprocessor (240) including the barcode (315).

7. The system (100) of claim 1, wherein the tracking unit top surface (210) comprises a decorative cover disposed thereon.

8. The system (100) of claim 1, wherein the facia top surface (410) comprises a decorative cover disposed thereon.

9. The system (100) of claim 1, wherein the system (100) comprises a keypad (920) disposed on the facia bottom surface (420), wherein the keypad (920) is operatively connected to the microprocessor (240), wherein the keypad (920) is for entering data into the microprocessor (240).

10. The system (100) of claim 1, wherein the system (100) comprises a manually activating silent alarm button (930) disposed on the tracking unit (200) operatively connected to the microprocessor (240).

11. The system (100) of claim 1, wherein the auxiliary tracking unit (600) is clandestinely disposed in an article of jewelry.

12. The system (100) of claim 1, wherein the auxiliary tracking unit (600) comprises a radio frequency identification chip.

13. The system (100) of claim 1, wherein the facia (400) comprises a rotating bezel (430) disposed thereon, wherein the rotating bezel (430) comprises an indicating arrow (950) for use in combination with numbers on the watch display as a combination lock for unlocking the locking wristband (500), wherein the bezel (430) comprises the rotating combination lock for unlocking the locking wristband (500).

14. The system (100) of claim 1, wherein the antenna (295) is operatively connected to the microprocessor (240) for adjusting the timekeeping component.

\* \* \* \* \*